Sept. 29, 1942.    M. T. GOETZ    2,296,845
TELEGRAPH TRANSMITTING SYSTEM
Filed July 15, 1940    2 Sheets-Sheet 1
FIG. 1
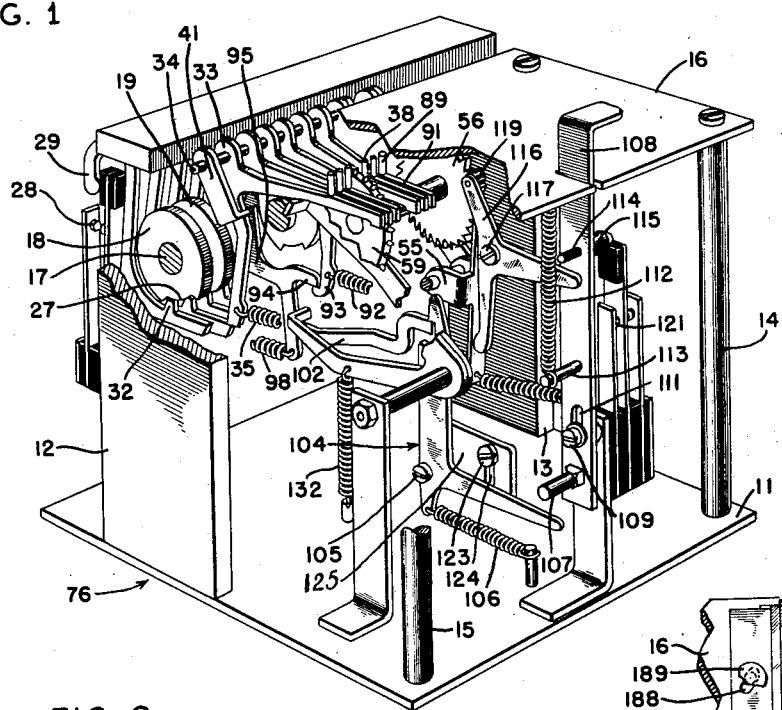
FIG. 9
FIG. 2
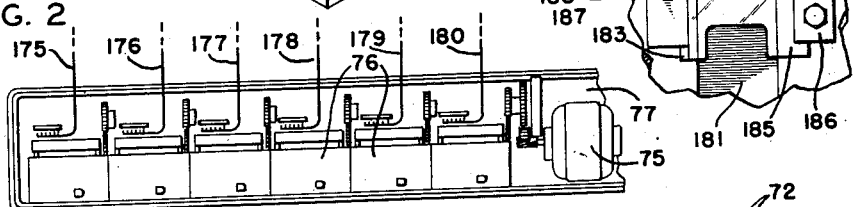
FIG. 3
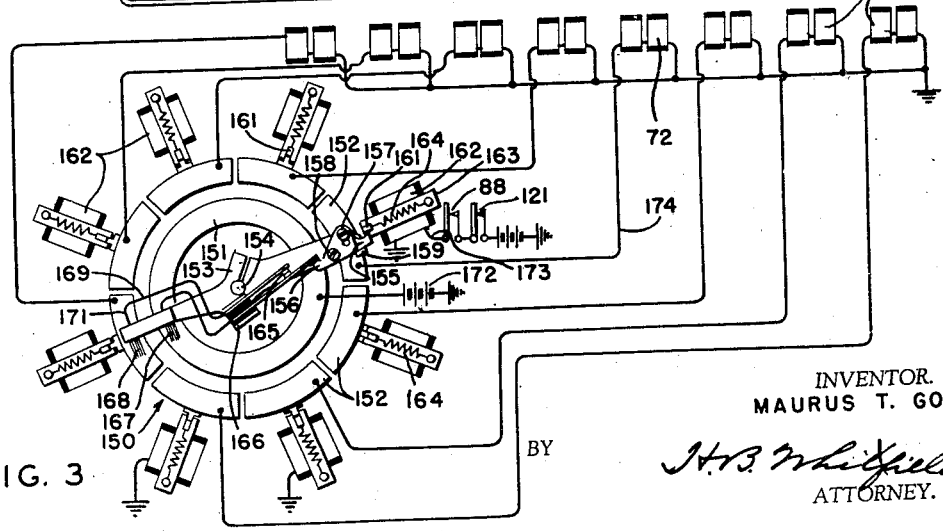
INVENTOR.
MAURUS T. GOETZ
BY
J. H. B. Whitfield
ATTORNEY.

Sept. 29, 1942.    M. T. GOETZ    2,296,845
TELEGRAPH TRANSMITTING SYSTEM
Filed July 15, 1940    2 Sheets-Sheet 2
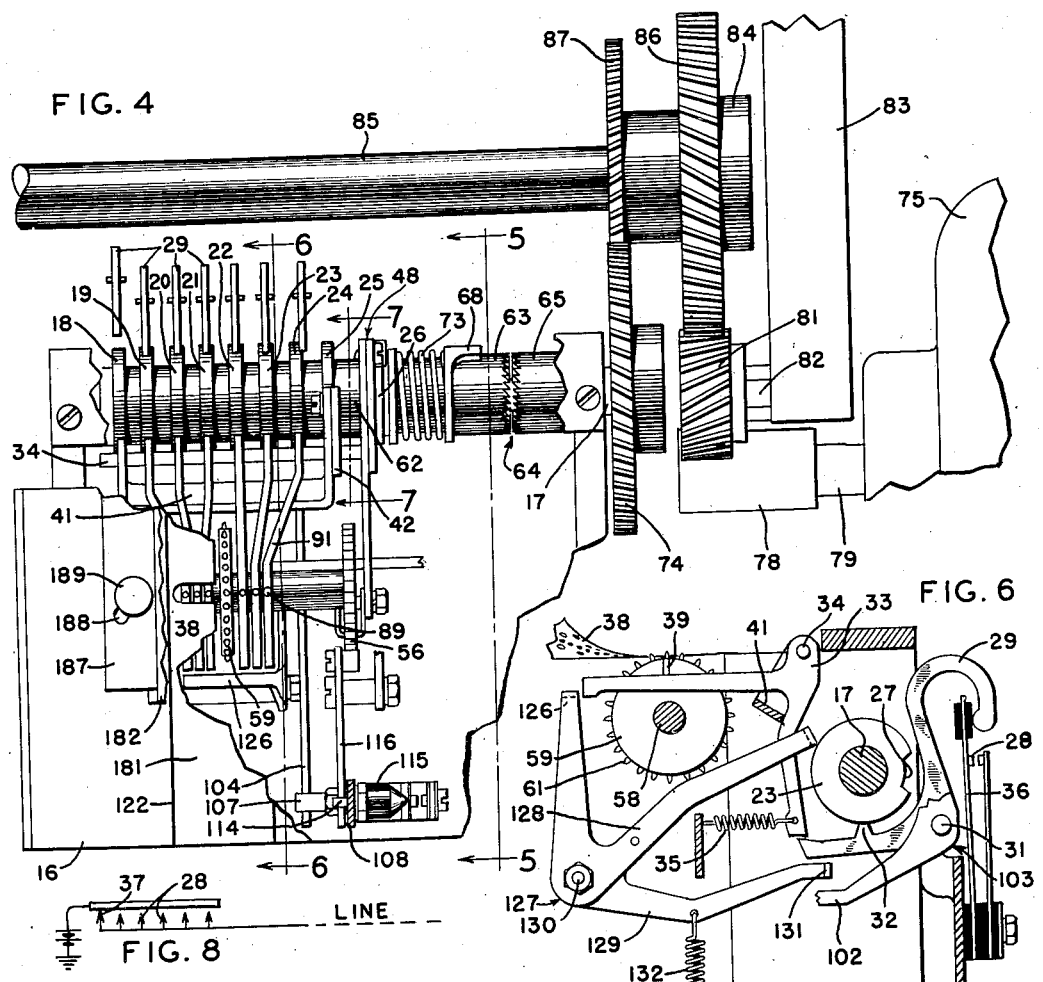
INVENTOR.
MAURUS T. GOETZ
H. B. Whitfield
ATTORNEY.

Patented Sept. 29, 1942

2,296,845

UNITED STATES PATENT OFFICE 2,296,845

TELEGRAPH TRANSMITTING SYSTEM

Maurus T. Goetz, Chicago, Ill., assignor to Teletype Corporation, Chicago, Ill., a corporation of Delaware Application July 15, 1940, Serial No. 345,456

17 Claims. (Cl. 178—17)

This invention pertains to printing telegraph apparatus and systems and more particularly to transmitter distributors and control arrangements therefor.

The principal object of the invention is to provide a selector system to control transmission to a single channel of communication from a group of transmitters.

Another object is to provide for the automatic sequential transmission of messages to a single channel of communication from a multiplicity of tape transmitters.

Another object of the invention is to provide in a record reader having means for sensing indicia in a control record strip, a control means and means effective under a certain condition of operation of the record reader indicative of record strip depletion to operate the control means.

A further object of the invention is to provide a record reader comprising means for sensing indicia in a record strip, control means, and means effective under certain predetermined conditions of operation of said sensing means to operate said control means momentarily.

To facilitate cross-office handling of messages, particularly in commercial telegraph offices, this invention provides a selector system and apparatus which will permit sequential automatic transmission of messages to a single outgoing channel of communication from individual transmitting units of a number of groups or banks of units distributed about the office. That is, one or more units of each group of units may be connected to the same outgoing line, and the selector system according to the present invention controls the sequence in which transmission from these units takes place. The individual units may be connected either directly to an outgoing line, or to a common reperforator located adjacent to a common transmitter connected directly to an outgoing line. The individual transmitter units identified with a particular channel of communication may or may not be in the same bank or multiple unit.

A feature of the invention resides in providing at each segment of a brush type distributor, an electromagnetically operated means for stopping the brush arm which is effective under the control of individual units of a multiple tape transmitter distributor.

A more complete understanding of the foregoing and other objects and features of the present invention may be had from the following description when taken in conjunction with the accompanying drawings, in which Fig. 1 is a perspective view of the apparatus according to the present invention with parts broken away to show more clearly internal structural features;

Fig. 2 is a plan view of a bank of transmitters mounted on a common base and driven by a common motor;

Fig. 3 is a schematic electrical diagram of a selector system showing the means for automatically controlling transmission from the transmitters of the type shown in Fig. 1;

Fig. 4 is a plan view of the transmitter according to the present invention with parts broken away to show internal structure;

Fig. 5 is a sectional view taken on line 5—5 of Fig. 4;

Fig. 6 is a sectional view taken on line 6—6 of Fig. 4;

Fig. 7 is a sectional view taken on line 7—7 of Fig. 4;

Fig. 8 is a schematic representation of a set of transmitting contacts; and

Fig. 9 is a fragmental top view of the transmitter showing the tape guiding means.

Having reference to Fig. 1, the tape transmitter according to the present invention comprises a base plate 11 on which are mounted supports 12, 13, 14 and 15 for a top plate 16. Journaled in supports 12 and 13 is a shaft 17 which carries a sleeve 62 on which are assembled cams 18 to 26, inclusive. Cam 18 is the start-stop cam and controls the transmission of the start and the stop impulses of the start-stop permutation code signals, the transmission of which the device of the present invention is adapted to control. Each of the cams 18 to 23 is provided with a notch 27, and these notches are arranged successively around shaft 17 in a helical manner such that, upon rotation of the cam assembly, a corresponding series of contacts 28 are operated sequentially to effect the transmission of permutation code signals in well-known manner.

Interposed between each cam 18 to 23 and its associated contact 28 is a bell crank lever 29 freely mounted on a shaft 31. The vertical arm of each of the levers 29 terminates in a reverted portion which controls the opening and closing of the associated contact 28. The horizontal arm of each of said levers 29 is provided with a cam lug or follower 32 which cooperates with the notch 27 of its associated cam of the series of cams 18 to 23 to close the contact 28 momentarily and at the proper instant in the code cycle. Having blocking relation with the free end of the horizontal arm of each bell crank lever 29 is the depending arm of a bell crank lever 33 (Fig. 6) pivotally supported on a shaft 34 mounted in brackets 12 and 13. Each of the levers 33 tends to rotate clockwise (as viewed in Fig. 6) under the influence of its individual spring 35.

It is observed that there is no bell crank lever 33 associated with the start-stop cam 18, and hence its associated contact 28 is invariably opened and closed for each cycle of rotation of the cam assembly on shaft 17. As is well-known in start-stop telegraphy the start-stop cam 18 is so positioned on shaft 17 that in the stop position the cam notch 27 is disposed directly over the cam follower 32 so that the contact 28 associated therewith remains closed owing to the resiliency of the contact spring 36 of the pair of contacts 28. This condition is illustrated diagrammatically in Fig. 8, wherein start-stop contact 28 is indicated as contact 37, and since the stop condition of the transmission line is a marking condition (that is, with current on the line), contact 37 is normally closed.

As previously alluded to, the depending arms of levers 33 act to block or permit the operation of levers 29. This blocking relation is controlled by the reading or sensing of a perforated tape 38 by a record reader comprising a group of sensing pins 39, each of which is carried on the horizontal arm of individual bell crank levers 33. The bell crank levers 33, which will hereinafter be referred to as the tape sensing levers, are normally held in their counterclockwise position, as shown in Fig. 6, by means of a bail 41 adjustably secured to a lever 42 (Fig. 7) by a slot and screw adjustment, indicated by the numeral 43. Bail 41 and lever 42 are pivotally supported on shaft 34, and lever 42 carries a cam follower roller 44 which is caused to ride on a cam 25 by a spring 46 fastened to the extremity of lever 42 and tending to bias said lever counterclockwise. The angular positionment of cam notch 47 of cam 25 is so related to the notches 27 on cams 18 to 23 that the bail 41 is timed to rotate clockwise to permit springs 35 to cause the tape sensing levers 33 to bring their sensing pins 39 into contact with the tape 38 in sufficient time so that the tape may be sensed and the blocking portions of levers 33 set correspondingly to allow the goose neck levers 29 to control contacts 28 in accordance with the code perforated in the tape 38.

In other words, when the bail 41 is operated clockwise to permit the sensing levers 33 to sense the tape 38, those levers 33 whose pins 39 have found a perforation in the tape 38 will be rotated clockwise by their springs 35 to swing their depending arms out of blocking relation with the horizontal arms of the associated goose neck levers 29, so that when the projections 32 thereof ride on the peripheries of their associated cams 18 to 23, and when a cam notch 27 registers with its projection 32, the goose neck lever 29 associated therewith will be rotated clockwise by the action of contact spring 36, thereby permitting the associated contact 28 to close. On the other hand, if no perforation is found by the pin 39, the goose neck lever 29 corresponding thereto will be blocked and no rotation of goose neck lever 29 or closing of contact 28 identified therewith will occur.

Also carried on shaft 17 is the tape stepping cam 26, which cooperates with a tape stepping lever 48 comprising a cam follower portion 49 and a pawl carrying portion 54 both of which are pivotally supported on shaft 34 and adjustably secured to each other by slot and screw means, indicated at 52. Portion 49 of lever 48 carries a cam follower roller 53 which by means of a spring 54 constantly rides on the periphery of cam 26. Portion 51 of lever 48 carries a stepping pawl 55 which is maintained in cooperative engagement with a ratchet wheel 56 by a spring 57. Ratchet wheel 56 is secured to a shaft 58, to which is also fixed a tape feed sprocket wheel 59 the pins 61 of which mesh with the row of feed holes (not shown) in the tape 38 in the usual manner. A feature of this tape feeding or advancing arrangement resides in the fact that the tape feed sprocket is of such diameter as to permit the tape sensing pins 39 to be arranged directly in line with the operative sprocket pins 61 so that the last code signal perforated in the tape 38 can be sensed and transmitted, whereas in prior arrangements the tape feed pins 61 were operative in advance of the sensing pins 39 (to the left, in Fig. 6) and hence several blank or unperforated areas (except for feed holes), or in some cases "letters" or all-marking code combinations, had to be perforated in the tape to assure that the entire perforated message would be fed to the sensing position.

In the stop position of cam 26, the follower roller 53 rests in the cam notch therein, so that upon initiation of rotation of the cam assembly for the transmission of a code signal, the follower roller 53 rides up onto the high dwell of the cam 26, causing the lever 48 to rotate counterclockwise, whereby the pawl 55 falls into engagement with the next tooth of ratchet wheel 56. Then at approximately the end of the cycle of rotation, after the code signal has been transmitted, the follower roller 53 again falls into the cam notch, thereby causing the lever 48 to rotate clockwise under the influence of spring 54 and permitting pawl 55 to rotate the ratchet wheel 56 (and hence, feed wheel 59) one step, to advance the tape 38 correspondingly.

Cams 18 to 26 are mounted on sleeve 62 freely rotatable on shaft 17, which sleeve is splined to a driven clutch member 63 of a jaw or toothed clutch 64, the driving member 65 of which is fixed to shaft 17. A clutch throw-out lever 66 (Fig. 5) pivoted at 67 acts to cam the driven portion 63 leftwardly, as view in Fig. 4, in well-known manner, in cooperation with a cam portion (not shown) on flange 68 when spring 69 biases the lever 66 counterclockwise (as viewed in Fig. 5). Lever 66 is provided with a pole piece 71 which cooperates with an electromagnet 72 (Figs. 3 and 5), so that when the electromagnet 72 is energized, as will hereinafter appear, the lever 66 will be rotated clockwise against the pull of spring 69 to release the upper end of lever 66 from the driven portion 63 of clutch 64, thereby permitting spring 73 to urge portion 63 rightwardly into meshing engagement with driving portion 65, thus causing rotation of the cams assembled on sleeve 62. Constant rotation is imparted to the driving portion 65 of clutch 64 by a gear 74, also fixed to shaft 17, which through a train of gears derives its power from a motor 75 (Fig. 4).

Referring to Figs. 2 and 4, the motor 75 is common to a battery or plurality of transmitting units 76 such as shown in Fig. 1. The motor 75 and the series of transmitting units 76 are mounted on a common base 77. A pinion gear 78 is fixed to shaft 79 of motor 75, and meshes with an idler gear 81 carried on a stud 82 secured to bracket 83 mounted on base 77. Journaled in a pair of brackets 84 supported on base 77 is a shaft 85 on which is fixedly carried a gear 86 meshed with idler gear 81, and a gear 87 meshed with gear 74 secured to shaft 17. Each of the units 76 is provided with a gear 74, which in turn is meshed with a gear corresponding to gear 87 fixed to shaft 85. Hence, through motor pinion 78 and gears 81, 86, and the plurality of pairs of gears 87 and 74, constant rotation is imparted to the shafts 17 individual to each of the units 76.

One feature of the invention resides in providing a mechanism which is effective automatically, when the end of the tape 38 is reached and is stepped or advanced past the sensing pins 39. to open a contact 88 (Fig. 5) to suspend transmission, as will hereinafter appear. A tape sensing pin 89, preferably of slightly larger diameter than the sensing pins 39, is carried on a special sensing lever 91 (Figs. 1 and 4) also pivoted on shaft 34. Pin 89 is adapted to sense, not a perforation in the tape, but instead the edge of the tape, so that as long as there is tape to be fed through the transmitter, the upward movement of the pin 39, and hence of the lever 91, is limited by the tape. But when the end of the tape is reached and is stepped past the sensing point by the ratchet 56 and feed wheel 59, the movement of pin 89 is no longer blocked and lever 91 is permitted to rotate a predetermined amount clockwise (as viewed in Fig. 5) by its spring 92 (Fig. 1) to disengage the depending arm 93 (Fig. 5) thereof from latching engagement with arm 94 of a three-armed lever 95 pivoted on shaft 31. Lever 95 is provided with a cam follower arm 96 which invariably rides on the periphery of cam 24 and invariably falls into the cam notch 97 by the amount of the overtravel (exemplified by space 90 between latch arm 93 and arm 94, Fig. 5) required to reset arm 94 in latching relation with arm 93. However, after disengagement of arm 93 from arm 94, follower 96, at an instant determined by the angular positionment of cam notch 97, falls fully into said notch due to the pull of a spring 98 connected to arm 99 of lever 95. In response to this counterclockwise movement of lever 95, a pin 101 carried thereon strikes against an arm 102 of a special goose neck lever 103 to rotate lever 103 counterclockwise (as viewed in Fig. 5) to open the contact 88 to break the energizing circuit for magnet 72, hereinafter traced.

The free end of arm 102 cooperates with the vertical arm of a latch lever 104 pivoted at 105 in such manner that, when lever 103 is rotated counterclockwise by pin 101 the arm 102 becomes latched up by lever 104 under the influence of spring 106 which normally tends to bias lever 104 clockwise. On the other hand, lever 104 is provided with a horizontal arm which is adapted to be acted upon by a stud 107 (Fig. 1) carried on a vertically slidable bar 108, which is guided for reciprocation by a notch in top plate 16 and by a screw 109 engaged by a slot 111 in bar 108. Bar 108 is normally biased upwardly by a spring 112 extending from plate 16 to a spring post 113 on said bar so that, when bar 108 is depressed against the action of spring 112, the stud 107 strikes the horizontal arm of lever 104, which is rotated clockwise (as viewed in Fig. 1) to cause the disengagement of the latch at the end of its vertical arm from arm 102 of goose neck lever 103 to permit the closure of contact 88.

Bar 108 also carries a pin 114 and a contact controlling element 115. Pin 114 cooperates with the horizontal arm of a three-armed lever 116, which is pivoted at 117 and is biased by a spring 118 (Fig. 5) in such manner that a detent roller 119, carried at the extremity of the vertical arm thereof, engages the teeth of tape feed ratchet 56. When the bar 108 is manually depressed, the element 115 cams the contact 121 (Fig. 1) open, and the pin 114 rotates lever 116 counterclockwise (as viewed in Fig. 5) against the action of spring 118; and in so doing, the depending arm of lever 116 acts upon pawl 55 to rotate the latter, against the pull of spring 57, to disengage the pawl tooth from the teeth of ratchet wheel 56. Under this condition (that is, while bar 108 is held depressed) the ratchet wheel 56 and feed wheel 59 are freely rotatable so as to facilitate the introduction of a new strip of perforated tape 38, which, as is known, is slipped between the face of groove 122 and a guide plate 182 (Figs. 4 and 9).

Contact 88, stop magnet 72 and contact 121 are included as will presently appear, in a control circuit for magnet 72. When a message is being transmitted under the control of a tape 38, the arm 102 of goose neck lever 103 is not latched by latch lever 104, and hence the contact 88 controlled by lever 103 is closed. Since bar 108 is held in its upward position, the contact 121 controlled thereby is also closed. Thus, through the means shown in Fig. 3, the energizing circuit for stop magnet 72 is completed, and the lever 66 is held in its clockwise or attracted position (Fig. 5) against the pull of spring 69, so that the upper end of lever 66 no longer engages cam 68 of member 63 of clutch 64, thus permitting the members 63 and 65 to engage to impart rotation to cam cylinder 62, whereupon signals are transmitted and the tape 38 advanced step by step due to the cyclic rotation of cam 26. When the end of the tape 38 is reached, the pin 89 is no longer blocked thereby, and hence lever 91 is rotated to disengage arm 93 from arm 94, and at the proper instant when cam follower 96 falls into notch 97, the pin 101 will strike arm 102 to rotate lever 103 sufficiently to open contact 88 to control the breaking of the energizing circuit for magnet 72, which, upon de-energization, permits lever 66 to open clutch 64 and stop rotation of cam cylinder 62. At the same time, arm 102 becomes latched by latch lever 104, and the transmitter 76 remains unoperated until transmission is again resumed by the introduction of a new strip or section of tape. The introduction of a new strip of tape is facilitated upon depression of bar 108 manually, which, through pin 114, acts to rotate lever 116 to remove detent 119 and pawl 55 from operative relationship with ratchet wheel 56, thus permitting shaft 58 (which carries ratchet wheel 56 and feed wheel 59) to be rotated freely. The bar 108 upon being depressed, also acts, through pin 107, to unlatch lever 104 from arm 102. Bar 108 is thereby dually effective to restore the "tape-out" control means to the further control of the feeler pin 89 and to facilitate the introduction of a new supply of tape.

The present invention also provides for momentarily opening contact 88 automatically when certain operating conditions are desired. Under these conditions, the lever 104 is held in its clockwise position (Fig. 1) out of latching relation with arm 102 by a screw 123 which is adjustably positionable in a slot 124 in plate 125, the said screw being adjusted to its lowermost position in slot 124 to depress the horizontal arm of lever 104 and hold it against the action of spring 106.

The horizontal arms of the tape sensing levers 33 are provided with enlarged ends so that a laterally extending portion 126 (Fig. 4) at the extremity of the vertical arm of a three-armed lever 127, pivoted at 130, will cooperate only with the ends of the series of code hole sensing levers 33, and not with the special lever 91. Lever 127 is also provided with an arm 128 which cooperates with notch 97 in cam 24. Lever 127 is further provided with an arm 129 terminating in a laterally disposed portion 131 adapted to overlie arm 102 of gooseneck lever 103. A spring 132 normally tends to rotate lever 127 in a clockwise direction (Fig. 6) so that the laterally disposed extremity of arm 128 constantly rides on cam 24. In this manner, lever 127, through its bail portion 126, is adapted to sense the ends of the tape sensing levers 33 once during each revolution of cam 23, when the end of arm 128 tends to fall into notch 27 (Fig. 6). The end of arm 128 can fall fully into notch 27 only when an all-marking condition occurs in the tape 38, the sensing of which by pins 39 permits all levers 33 to rotate counterclockwise under the action of their springs 35 to cause the ends of the horizontal arms of said levers 33 to clear the bail portion 126 of lever 127, whereupon lever 127 responds fully to the pull of its spring 132 so that end 131 of arm 129 strikes against arm 102 of lever 103, causing lever 103 to rotate counterclockwise to open its associated contact 88. Lever 127 remains in the fully selected clockwise position only for a short interval (corresponding to transmission time for one impulse), and is restored before the end of the same cycle in which its selection by a letters (all-marking) combination occurred. Lever 127 will remain in its counterclockwise position until another all-marking code combination is sensed in the tape 38.

Formed in the top plate 16 is a shallow groove 181 of tape width, by means of which the tape 38 is guided therealong, and mounted on the top plate 16 and overlying groove 181 is a tape guide plate or lid 182. The lid 182 is provided with bevelled edges 183 and 184, and a laterally disposed stop lug 185. A bar 186 is secured to top plate 16 and provides a fixed stop or guide for the lid 182 to assure its proper placement with respect to the sensing pins 39. Also mounted on plate 16 and arranged parallel to bar 186 is a clamping member 187 which is provided with an obliquely positioned slotted hole 188 that cooperates with a clamping screw 189. Clamping screw 189 is provided with a knurled thumb portion and is threaded into plate 16, so that when the screw 189 is loosened, the member 187 is movable leftwardly and downwardly (as viewed in Fig. 9), thus increasing the distance between members 186 and 187 and permitting the ready removal of lid 182. Conversely, to apply lid 182 to the plate 16, the lid 182, in being laid on plate 16, is pressed against fixed bar 186, bringing portion 185 tightly against the end of bar 186 to properly locate lid 182 with respect to the sensing pins 39. Then the member 187 is urged toward the bar 186, the camming relation between the slotted hole 188 and screw 189 acting to readily clamp the lid 182 securely between the members 186 and 187, and, after the lid 182 is properly seated, the screw 189 is tightened, thereby securely maintaining the lid 182 in place. Lid 182 is preferably of transparent material to facilitate reading of the entire section of tape. This tape guide arrangement is disclosed and claimed in copending patent application Ser. No. 345,449 filed July 15, 1940, by Gordon Sim.

In Fig. 3 there is shown a selector system for automatically controlling transmission from the transmitters of the present invention. A brush type distributor is indicated generally as 150, and comprises an inner ring 151 and a plurality of segments 152 in an outer ring. An arm 153 is clamped to the shaft 154 of the distributor 150 and is frictionally driven in well-known manner. Arm 153 carries a compound lever consisting of two parts or members 155 and 156, capable of mutual adjustment by means of a screw 157, and pivoted as an assembly on a shoulder screw 158. The right end of member 155 is arranged to engage an upturned lug 159 on arm 153 and also extends to a position where it will engage any of the stop levers 161 associated with magnets 162. The stop levers 161 consist of armature levers for magnets 162 and are pivoted on the magnet yoke members 163, the portion of lever 161 upstanding from the pivot constitutes the stop for lever member 155 and the depending arm of the lever carries a pole piece (not shown) which cooperates with the core of the magnet 162. Upon energization of magnet 162 the stop lever 161 is rotated so as to bring its upstanding arm into the path of member 155 against the action of its spring 164. When the magnet 162 becomes deenergized the spring 164 will rotate stop lever 161 so that the upstanding arm is withdrawn from the path of member 155.

Rotating arm 153 also carries a pair of contacts 165 secured to upturned lug 166. Contacts 165 are closed when member 155 engages any one of the stop levers 161. Also carried on arm 153 are two brushes 167 and 168 insulated therefrom, and connected by wires 169 and 171 to the two springs of contact pair 165. Brush 167 engages the inner ring 151 to which is connected positive battery 172, and the brush 168 impresses this positive battery upon the particular segment 152 on which it stops when member 155 engages a stop lever 161 and closes contact pair 165.

The selector system comprising the distributor 150 is arranged with one magnet 162 located diametrically opposite to a corresponding segment 152. Each magnet 162 is connected by a wire 173 to the contacts 88 and 121 of a transmitter unit 76, which, as previously described, are held closed when tape is being fed through that transmitter, and contact 88 is opened when the tape 38 has been fed past the sensing position. Each of the segments 152 is connected by a wire 174 to the clutch trip magnet 72 on their respective transmitter distributor 76.

When tapes are placed in any or all of the connected transmitter distributors 76 connected to the outer segments 52, their respective magnets 162 are energized, over a circuit (Fig. 3) extending from ground, through winding of magnet 162, thence through contacts 88 and 121 to grounded battery. The corresponding stop levers 161 are rotated to their operative position, wherein the upstanding arms thereof are moved into the path of the right extension of member 155 carried on arm 153. Since arm 153 normally tends to rotate continuously, the first stop lever 161 which moved into its path would engage the right end of member 155, which in turn would be rotated clockwise about shoulder screw 158 until stopped by upturned lug 159. This clockwise rotation closes contact 165 and completes the circuit from positive battery, through ring 151, brush 167, contact 165, brush 168, segment 152, wire 174 and through the winding of clutch magnet 72 to ground, thereby energizing the particular transmitter distributor 72 connected to the segment engaged by the brush 168, and permits the perforated tape 38 to be fed through that transmitter.

Meanwhile, the other magnets 162 which may have been energized by the presence of tape in their respective transmitters 76, remain in this energized condition. When the tape 38 has been fed past the special sensing pin 89 in the transmitter, its contact 88 opens and deenergizes the magnet 162, thus permitting its spring 164 to withdraw stop lever 161 from the path of member 155. The compound lever comprising members 155 and 156 immediately rotates counterclockwise under the influence of the contact spring and contact 165 opens, thereby deenergizing the clutch trip magnet 72 of the connected transmitting distributor and stopping transmission from that unit. Brush arm 153 then begins rotation and continues in the direction shown in Fig. 3 until member 155 engages the next stop lever 161 which is in an operated position. Accordingly, the several transmitters 76 are connected to the outgoing channels 175 to 180 in a sequence predetermined by their assignment to segments 152 of the outer ring.

While only eight segments 152 are shown in the embodiment illustrated in Fig. 3, it is manifest that the number of segments may be increased or decreased over a wide range. Moreover, the segments 152 of a single distributor 150 need not all be connected to the clutch trip magnets 72 of the same assembly of units 76, shown in Fig. 2, but one or more segments 152 may be connected to the clutch trip magnets 72 of one or more multiple transmitter distributors.

In the event that it is not desired to have the brush arm 153 rotated continuously when there is tape in no one of the transmitters 76, one of the segments may be assigned as a dead position and its magnet 162 selected by a chain circuit through a series of contacts, one contact for each of the other magnets, which contacts are arranged to be operated when the other magnets are deenergized. Thus, when all of the other magnets 162 are deenergized, a series circuit will be completed to cause the energization of the magnet 162 assigned to the dead position thereby stopping arm 153 in this position, until tape is placed in one or more of the transmitters 76.

Although the present invention has been disclosed in connection with certain specific embodiments thereof, it is understood that such embodiments are merely illustrative and not restrictive, and that all forms coming within the scope of equivalency of the appended claims are intended to be covered by the invention.

What is claimed is:

1. In a record reader, means for sensing a record strip including a special sensing means, control means, a sequence device, means responsive to said special sensing means under certain operating conditions to operate said control means to govern the operation of said sequence device, and manually operated means to restore said control means to further control of said sensing means.

2. In a record reader, means for sensing indicia in a record strip, control means, means effective under certain conditions of operation of said sensing means to operate said control means, and manually operated means to restore said control means to the further control of said sensing means.

3. In a record reader, means for sensing indicia in a record strip, control means, means effective under a certain condition of operation of said sensing means indicative of record strip depletion tending to operate said control means, and means dually effective to restore said control means, when operated, to the further control of said sensing means and to facilitate the introduction of a new supply of record strip.

4. In a record reader, means for sensing indicia in a record strip, control means, means effective under a certain condition of operation of said sensing means indicative of record strip depletion to operate said control means, and manually operated means dually effective to restore said control means to the further control of said sensing means and to facilitate the introduction of a new supply of record strip.

5. In combination, a record reader including means for sensing indicia in a record strip, control means, cam means for timing the operation of said control means, a sequence device, and means effective under a certain condition of operation of said record reader indicative of record strip depletion to operate, through the instrumentality of said cam means, said control means to govern said sequence device.

6. In combination, a record reader including means for sensing indicia in a record strip, control means, means effective under a certain condition of operation of said record reader indicative of record strip depletion to operate said control means, and means dually effective to restore said control means to the further control of said sensing means and to facilitate the introduction of a new supply of record strip.

7. In combination, a record reader having a row of feeler pins for sensing indicia in a record strip, control means, timing means for said control means, and an additional feeler pin in said row effective under a certain condition of operation of said record reader indicative of record strip depletion to operate through said timing means said control means 8. In combination, a record reader having a row of feeler pins for sensing indicia in a record strip, control means, an additional feeler pin in said row effective under a certain condition of operation of said record reader indicative of record strip depletion to operate said control means, and means dually effective to restore said control means to the further sensing of said feeler pins and to facilitate the introduction of a new supply of record strip.

9. In a telegraph system, a single channel of communication, a plurality of transmitters, sending contacts in each transmitter, a record reader in each transmitter for controlling the sending contacts thereof, a seeker means, means for conditioning said seeker means, and means in said record reader effective under a certain condition of operation thereof indicative of record strip depletion for controlling said seeker conditioning means to govern the connection of said transmitters to said channel of communication.

10. In a telegraph system, a single channel of communication, a plurality of tape transmitters, each transmitter comprising means for sensing indicia in said tape, control means, and means effective under a certain condition of operation of said sensing means indicative of record strip depletion to operate said control means, a seeker means, and means effective under the control of said control means for conditioning said seeker means to govern the connection of said transmitters to said channel of communication.

11. In a telegraph system, a single channel of communication, a plurality of tape transmitters, each transmitter comprising means for sensing indicia in said tape, control means, means effective under a certain condition of operation of said sensing means indicative or record strip depletion to operate said control means, and clutch means to govern the effectiveness of said transmitter, seeker means, and means effective under the control of said control means for conditioning said seeker means to govern, through the instrumentality of said clutch means, the connection of said transmitters to said channel of communication.

12. In combination, a record reader having a row of feeler pins for sensing indicia in a record strip, control means, timing means for said control means, and additional means for detecting the presence or absence of said strip in said sensing position to operate through said timing means said control means accordingly.

13. In a telegraph system, a single channel of communication, a plurality of transmitters, sending contacts in each transmitter, a record reader in each transmitter for controlling the sending contacts thereof, switching means, means for conditioning said switching means, and means in said record reader effective under a certain condition thereof indicative of record strip depletion for controlling said conditioning means to govern the switching of said transmitters to said channel of communication.

14. In a record reader, means for sensing indicia in a tape, cyclically operable tape stepping means, control means, means effective under a certain condition of operation of said sensing means indicative of tape depletion to operate said control means, and manually operated means dually effective to restore said control means to the further control of said sensing means and to disable said cyclically operable tape stepping means to facilitate the introduction of a new supply of tape.

15. In a record reader, means for sensing indicia in a record strip, special sensing means, cyclically rotatable cam means, a sequence device, and mechanical instrumentalities operable under the control of said special sensing means, through the instrumentality of said cam means, to control the operation of said sequence device.

16. In a record reader, means for sensing indicia in a record strip including a special sensing means, cyclically rotatable cam means, follower means for said cam means, said follower having latching relationship with said special sensing means to govern under certain predetermined operating conditions the effectiveness of said follower, control means, a control lever for said control means, means on said follower lever for actuating said control lever, detent means for holding said control lever in actuated position, and manually operated means to restore said control means to further control of said sensing means.

17. In a record reader, means for sensing indicia in a record strip including additional means for sensing a condition of record strip depletion, timing means, a timing lever therefor, said additional means having blocking relationship with said timing lever to govern in response to record strip depletion the effectiveness of said lever, control means, a control lever for said control means, means on said timing lever for actuating said control lever, detent means for holding said control lever in actuated position, and manually operated means to restore said control means to further control of said additional means.

MAURUS T. GOETZ.